US008146359B2

(12) United States Patent
Currie et al.

(10) Patent No.: US 8,146,359 B2
(45) Date of Patent: Apr. 3, 2012

(54) DUAL INLET TURBOCHARGER SYSTEM FOR INTERNAL COMBUSTION ENGINE

(75) Inventors: David Currie, New Hudson, MI (US); Anthony William Hudson, Highland, MI (US); Patrick Sexton, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 838 days.

(21) Appl. No.: 12/209,502

(22) Filed: Sep. 12, 2008

(65) Prior Publication Data

US 2010/0064683 A1 Mar. 18, 2010

(51) Int. Cl.
*F02B 33/44* (2006.01)
*F02B 33/00* (2006.01)
*F01D 3/02* (2006.01)

(52) U.S. Cl. ........... 60/612; 123/562; 415/101; 415/102

(58) Field of Classification Search .................... 60/612; 123/562; 415/101, 102
See application file for complete search history.

(56) References Cited

U.S. PATENT DOCUMENTS

| | | | | |
|---|---|---|---|---|
| 4,327,698 | A | 5/1982 | Hamai et al. | |
| 4,329,843 | A | 5/1982 | Inoue et al. | |
| 4,879,980 | A | 11/1989 | Piazzo | |
| 4,993,227 | A | 2/1991 | Nagura et al. | |
| 5,207,714 | A | 5/1993 | Hayashi et al. | |
| 5,523,063 | A | 6/1996 | Anderson | |
| 5,911,211 | A * | 6/1999 | Uchida | 123/559.1 |
| 6,470,867 | B2 | 10/2002 | Akiwa et al. | |
| 6,513,506 | B1 | 2/2003 | Ito et al. | |
| 6,672,296 | B2 | 1/2004 | Ito et al. | |
| 6,776,146 | B1 | 8/2004 | Ricart-Ugaz et al. | |
| 6,889,673 | B2 | 5/2005 | Bender et al. | |
| 6,948,314 | B2 * | 9/2005 | Arnold et al. | 60/612 |
| 6,955,162 | B2 * | 10/2005 | Larson et al. | 123/568.11 |
| 7,140,357 | B2 | 11/2006 | Wei et al. | |
| 7,243,641 | B2 | 7/2007 | Zukouski | |
| 7,363,761 | B1 | 4/2008 | Dickerson | |
| 7,461,507 | B2 * | 12/2008 | Arnold et al. | 60/605.1 |
| 7,628,018 | B2 * | 12/2009 | Mowill | 60/726 |
| 7,975,478 | B2 * | 7/2011 | Zielke et al. | 60/605.2 |
| 2002/0088443 | A1 | 7/2002 | Marthaler et al. | |

FOREIGN PATENT DOCUMENTS

| | | |
|---|---|---|
| JP | 8284767 | 10/1996 |

OTHER PUBLICATIONS

Arnold, "Single Sequential Turbocharger: A New Boosting Concept for Ultra-Low Emission Diesel Engines," SAE Technical Paper Series, SAE International, Apr. 14-17, 2008 World Congress, Detroit, MI, USA.

* cited by examiner

*Primary Examiner* — Quyen Leung
*Assistant Examiner* — Thomas Truong
(74) *Attorney, Agent, or Firm* — Julia Voutyras; Alleman Hall McCoy Russell & Tuttle LLP

(57) ABSTRACT

A dual-inlet turbocharger system for internal combustion engine includes a single-shaft turbocharger with a dual-inlet compressor section. An air router provides a bifurcated air supply for the dual-inlet compressor section, and also provides a bifurcated source of charge air for the engine's cylinders in the case in which the present turbocharger system is applied to a V-block engine.

15 Claims, 3 Drawing Sheets

DUAL INLET TURBOCHARGER SYSTEM FOR INTERNAL COMBUSTION ENGINE

CROSS REFERENCE TO RELATED APPLICATIONS

None.

BACKGROUND OF THE INVENTION

1. Field of the Invention

The present invention is related to a turbocharged internal combustion engine in which the compressor section of the turbocharger has more than one air inlet.

2. Disclosure Information

Turbocharging has been in use for many years with internal combustion engines. Recent requirements for reduced exhaust emissions, coupled with an increased demand for better fuel economy, have rendered turbocharging more important than ever. Designers of contemporary turbochargers are faced with a myriad of challenges. One of the challenges relates to the sizing of the turbocharger, inasmuch as a larger turbocharger, may be required to provide enough air to operate an engine efficiently at a variety of operating conditions, such as at high altitude. A problem arises, however, if the turbocharger compressor section is too large physically, because this generally increases the amount of time required for the turbocharger to increase rotational speed and, therefore, mass throughput, in response to a command for more engine torque. Thus, so called "turbo lag" may ensue. A current solution favors the application of two turbochargers of smaller size. This, however, greatly increases cost, complexity and packaging concerns.

Most known automotive turbochargers use a single turbine and a single compressor attached to a single shaft. However, it has been determined that two compressor wheels may be attached back to back and indeed, combined into a single piece, with the result being that the performance of the turbocharger is enhanced with a single turbocharging unit.

It would be desirable to provide an air system for a turbocharged engine having more than one compressor element on a single shaft, while minimizing the amount of air system plumbing hardware under the hood of the vehicle, so as to make the engine air system both compact and efficient.

SUMMARY OF THE INVENTION

According to an aspect of the present invention, a turbocharger system for an internal combustion engine includes a single-shaft turbocharger having a dual-inlet compressor section with a compressed air outlet. An air router includes at least one ambient air inlet and a number of ambient air outlets in fluid communication with the ambient air inlet. The ambient air outlets are connected to a number of inlet portions of the compressor section. A compressed air inlet is also included in the air router, with the compressed air inlet receiving air discharged from the compressor section of the turbocharger. Finally, a compressed air supply port, in fluid communication with the compressed air inlet, provides air to a charger manifold which furnishes air to the engine's cylinders.

According to another aspect of the present invention, a turbocharger system may include an intercooler located between the compressed air outlet and the compressed air inlet of the air router.

According to another aspect of the present invention, a dual-inlet compressor section may have both an axially directed inlet and a radially directed inlet, with both of the inlets being connected with ambient air outlets of the air router.

According to another aspect of the present invention, an internal combustion engine has a double-bifurcated air system with the engine including a V-configured cylinder block, and a single-shaft turbocharger mounted in the valley region of the cylinder block, with a turbocharger having a dual-inlet compressor section with a compressed air outlet. An air router includes at least one ambient air inlet and a bifurcated ambient air outlet in fluid communication with the ambient air inlet, with the bifurcated ambient air outlet being connected to two inlet portions of the compressor section. A compressed air inlet receives air discharged from the compressor section, and a compressed air supply port in fluid communication with the compressed air inlet has a bifurcated charge air manifold mounted to the compressed air supply port, with the bifurcated charge air manifold furnishing charge air to two cylinder banks of the engine.

It is an advantage of a dual-inlet turbocharger system for an internal combustion engine according to the present invention that not only spark ignited, but also compression ignition engines may be provided with compressed charge air with an air system having minimal package volume and weight.

It is another advantage of the system according to the present invention that superior engine performance will be provided because of better response characteristics of the turbocharger system.

Other advantages, as well as features of the present invention, will become apparent to the reader of this specification.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENTS

Figure 1:
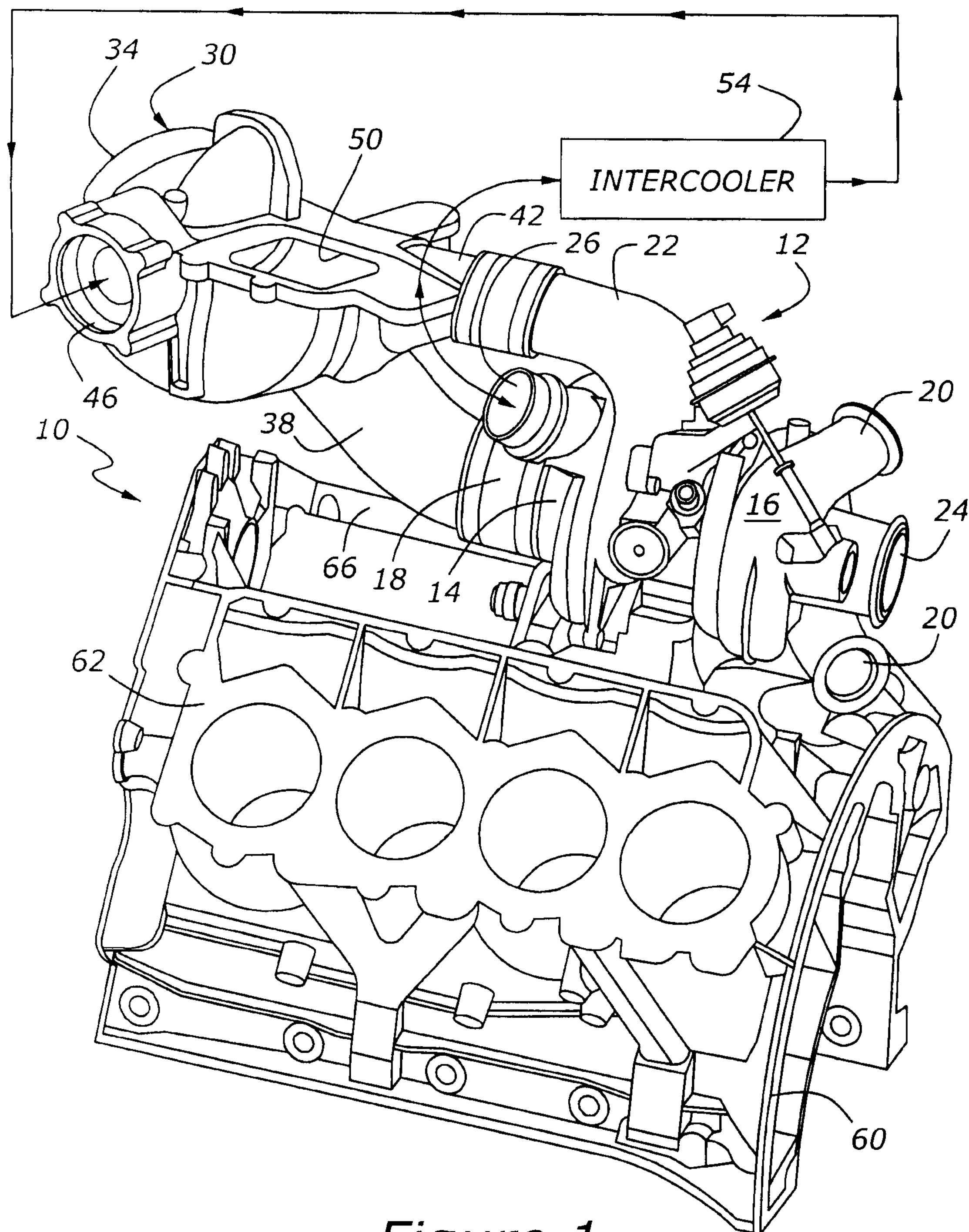
FIG. 1 is perspective view of an engine having a turbocharger system according to the present invention.
Figure 2:
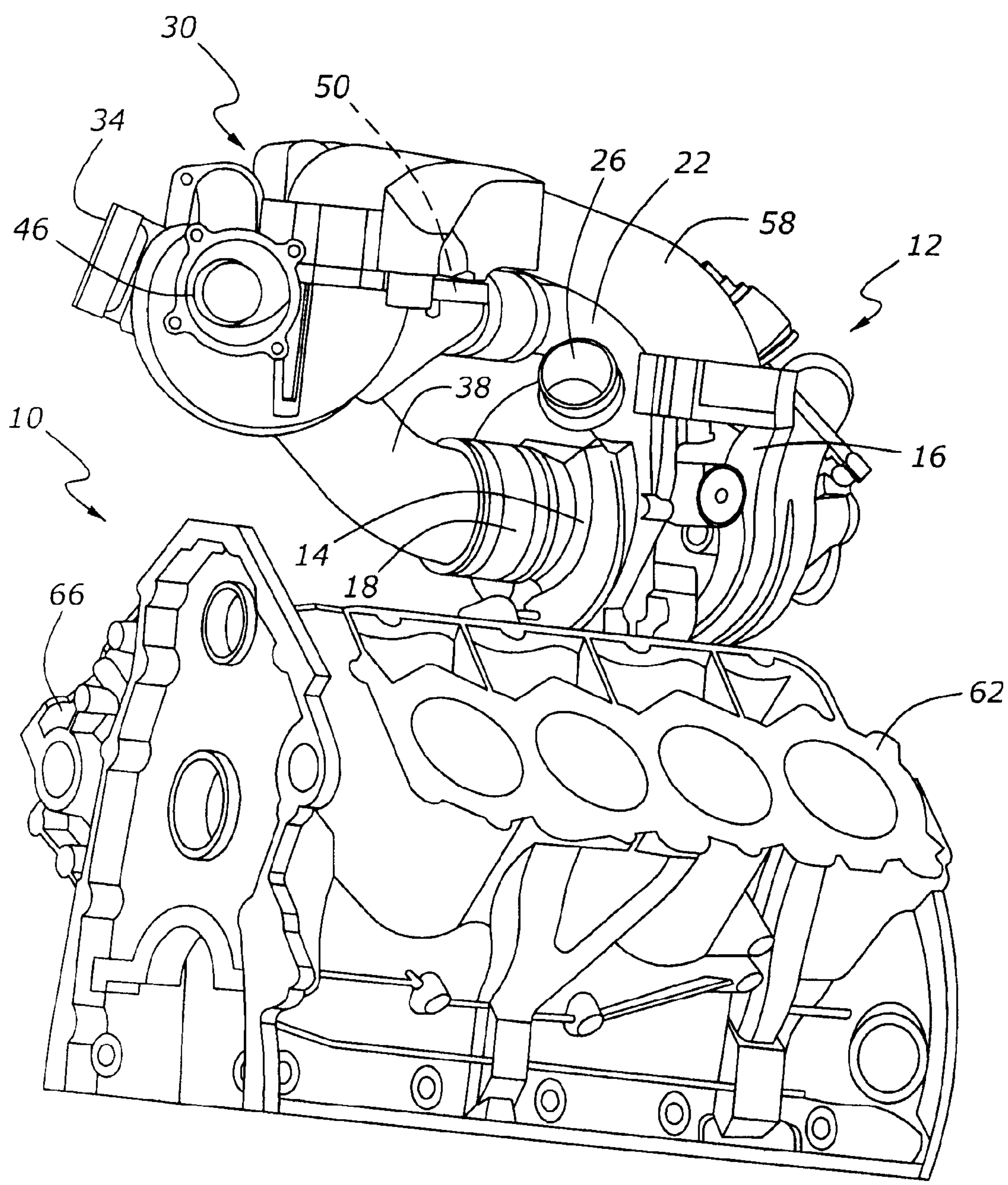
FIG. 2 is a second perspective view of an engine having a turbocharger system according to the present invention.

As shown in FIGS. 1 and 2, an engine, 10, has a turbocharger, 12, with a compressor section 14, and a turbine section 16. Turbocharger 12 is a single-shaft turbocharger having a dual-inlet compressor section, with a compressed air outlet 26. Compressor section 14 has an axially-directed compressor inlet, 18, and a radial compressor inlet, 22. A turbine section, 16, has two radially directed exhaust inlets, 20, and an axially directed exhaust outlet, 24.

Air is fed to compressor section 14 by an air router, 30. Air router 30 has an ambient air inlet, 34, shown in both FIGS. 1 and 2, and a number of ambient air outlets in fluid communication with ambient air inlet 34. These include an axial ambient air outlet, 38, and radial ambient air outlet, 42. Axial outlet 38 is connected with axial compressor inlet 18, of compressor section 14, whereas radial ambient air outlet 42 is connected with radial compressor inlet 22 of compressor section 14. Thus, it is seen that air router 30 has a bifurcated ambient air outlet in fluid communication with ambient air inlet 34.

Air leaving turbocharger compressor section 14 travels through intercooler 54, and then into compressed air inlet 46 of air router 30 (FIG. 1). After passing through air router 30, air moves to compressed air supply port 50, wherein the air is discharged into a bifurcated charge air manifold, 58, (FIG. 2).

As shown in FIGS. 1 and 2, turbocharger 12 is mounted in a valley area between adjacent cylinder banks of a cylinder block, 60. Moreover, FIG. 2 shows that the second half of the bifurcation in the present inventive air system occurs at the charge air manifold 58, inasmuch as air from a single compressed air supply port 50 is discharged to the engine's cylinders by means of bifurcated charge air manifold 58. Air router 30 achieves this dual bifurcation which starts with air entering single ambient air inlet 34 and being bifurcated and sent to turbocharger 12, with the air flows being united at turbocharger compressed air outlet 26, and then passing to intercooler 54, followed by bifurcation once again by charge air manifold 58.

Figure 3:
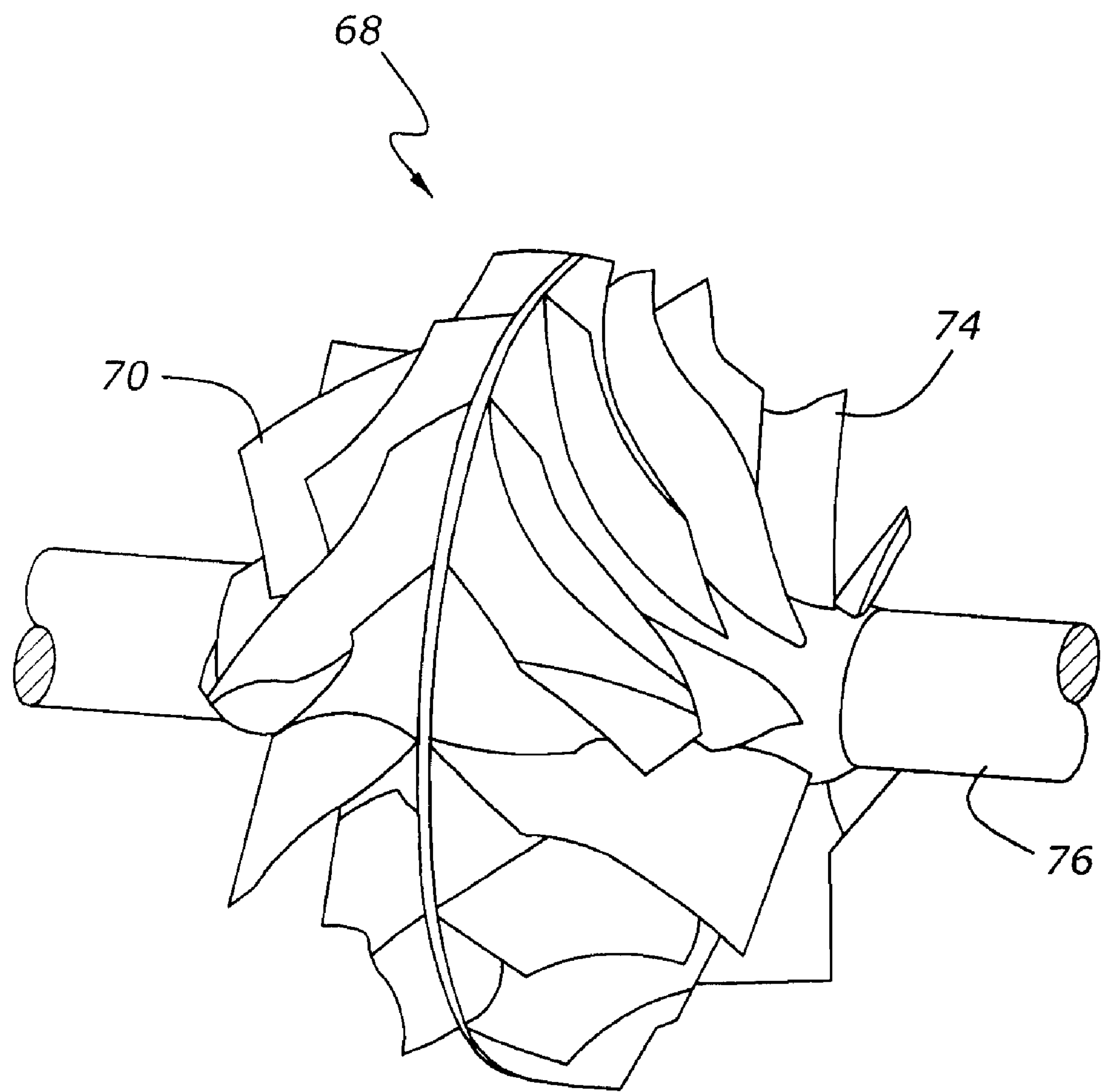
FIG. 3 illustrates a compressor wheel according to an aspect of the present invention.

FIG. 3 illustrates a type of compressor wheel 68, useful for practicing the present invention, in which two compressor wheels, 70 and 74, are joined into a single piece compressor wheel mounted to single shaft 76, with an exhaust turbine (not shown). Other alternatives exist, and those skilled in the art will appreciate in view of this disclosure that the present invention could be practiced with two or more separate compressor wheels mounted with an exhaust turbine upon a common shaft.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A turbocharger system for an internal combustion engine, comprising:

a single-shaft turbocharger having a dual-inlet compressor section with a compressed air outlet; and an air router contained in a housing, comprising:

at least one ambient air inlet in the housing;

a plurality of ambient air outlets in the housing in fluid communication with said ambient air inlet, with said ambient air outlets being connected to a plurality of inlet portions of said dual-inlet compressor section;

a compressed air inlet in the housing for receiving air discharged from said dual-inlet compressor section; and a compressed air supply port in the housing in fluid communication with said compressed air inlet.

2. The turbocharger system according to claim 1, further comprising an intercooler located upstream from the housing of the air router between said compressed air outlet and said compressed air inlet of the housing.

3. The turbocharger system according to claim 1, wherein said dual-inlet compressor section has an axially directed inlet and a radially directed inlet, with both of said axially directed inlet and said radially directed inlet being connected with said ambient air outlets of said air router.

4. The turbocharger system according to claim 1, further comprising a charge air manifold connected to said compressed air supply port of said air router.

5. The turbocharger system according to claim 1, wherein said dual-inlet compressor section comprises a plurality of compressor elements attached to a single shaft.

6. The turbocharger system according to claim 5, wherein said plurality of compressor elements comprises back-to-back compressor wheels attached to the single shaft.

7. The turbocharger system according to claim 6, wherein said back-to-back compressor wheels are one-piece.

8. An internal combustion engine, comprising:

a cylinder block;

a single-shaft turbocharger mounted to said cylinder block, with said turbocharger having a dual-inlet compressor section with a compressed air outlet; and an air router contained in a housing, comprising:

at least one ambient air inlet in the housing;

a plurality of ambient air outlets in the housing in fluid communication with said ambient air inlet, with said ambient air outlets being connected to inlet portions of said compressor section;

a compressed air inlet in the housing for receiving air discharged from said compressor section;

a compressed air supply port in the housing in fluid communication with said compressed air inlet;

an intercooler located upstream from the housing of the air router between the compressed air outlet and the compressed air inlet of the housing; and a charge air manifold connected to the compressed air supply port.

9. The internal combustion engine according to claim 8, wherein said engine comprises a compression ignition engine.

10. The internal combustion engine according to claim 8, wherein said engine comprises a spark ignition engine.

11. The internal combustion engine according to claim 8, wherein said compressor section comprises a plurality of compressor wheels attached to a single shaft.

12. The internal combustion engine according to claim 11, wherein said plurality of compressor wheels comprises a single piece.

13. The internal combustion engine according to claim 8, wherein said cylinder block has a vee configuration, with said turbocharger being mounted to said cylinder block between two banks of cylinders.

14. The internal combustion engine according to claim 8, wherein said compressor section has a single compressed air outlet.

15. An internal combustion engine with a double-bifurcated air system, with said engine comprising:

a vee-configured cylinder block;

a single-shaft turbocharger mounted in a valley region of said cylinder block, with said turbocharger having a dual-inlet compressor section with a compressed air outlet; and an air router in a housing, comprising:

at least one ambient air inlet in the housing;

a bifurcated ambient air outlet in the housing in fluid communication with said ambient air inlet, with said bifurcated ambient air outlet being connected to two inlet portions of said compressor section;

a compressed air inlet in the housing for receiving air discharged from said compressor section;

a compressed air supply port in the housing in fluid communication with said compressed air inlet;

an intercooler located upstream from the housing of the air router between the compressed air outlet and the compressed air inlet of the housing; and a bifurcated charge air manifold connected to the compressed air supply port, with the charge air manifold furnishing charge air to two cylinder banks of the engine.

* * * * *